June 6, 1972  R. W. GRAYBILL ET AL  3,667,747
CONVEYOR HEATER
Filed May 19, 1970  2 Sheets-Sheet 1
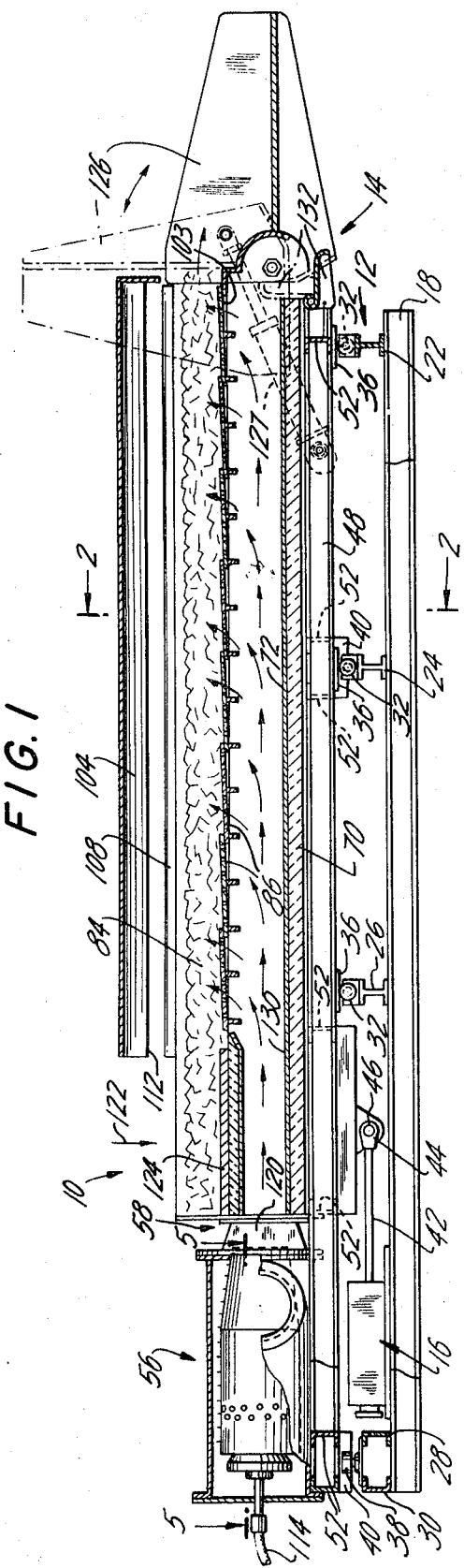
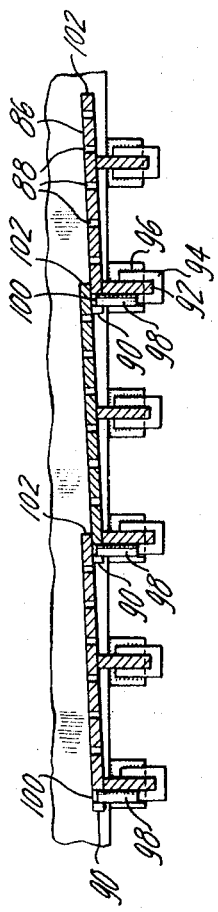
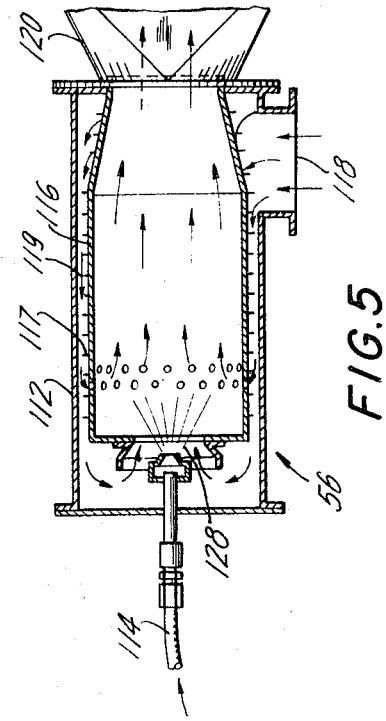
INVENTORS.
ROBERT W. GRAYBILL,
STANLEY C. REIBER,
DONALD W. NACE &
ELLIS S. WHITE
BY Brumbaugh, Graves, Donohue & Raymond
their ATTORNEYS.

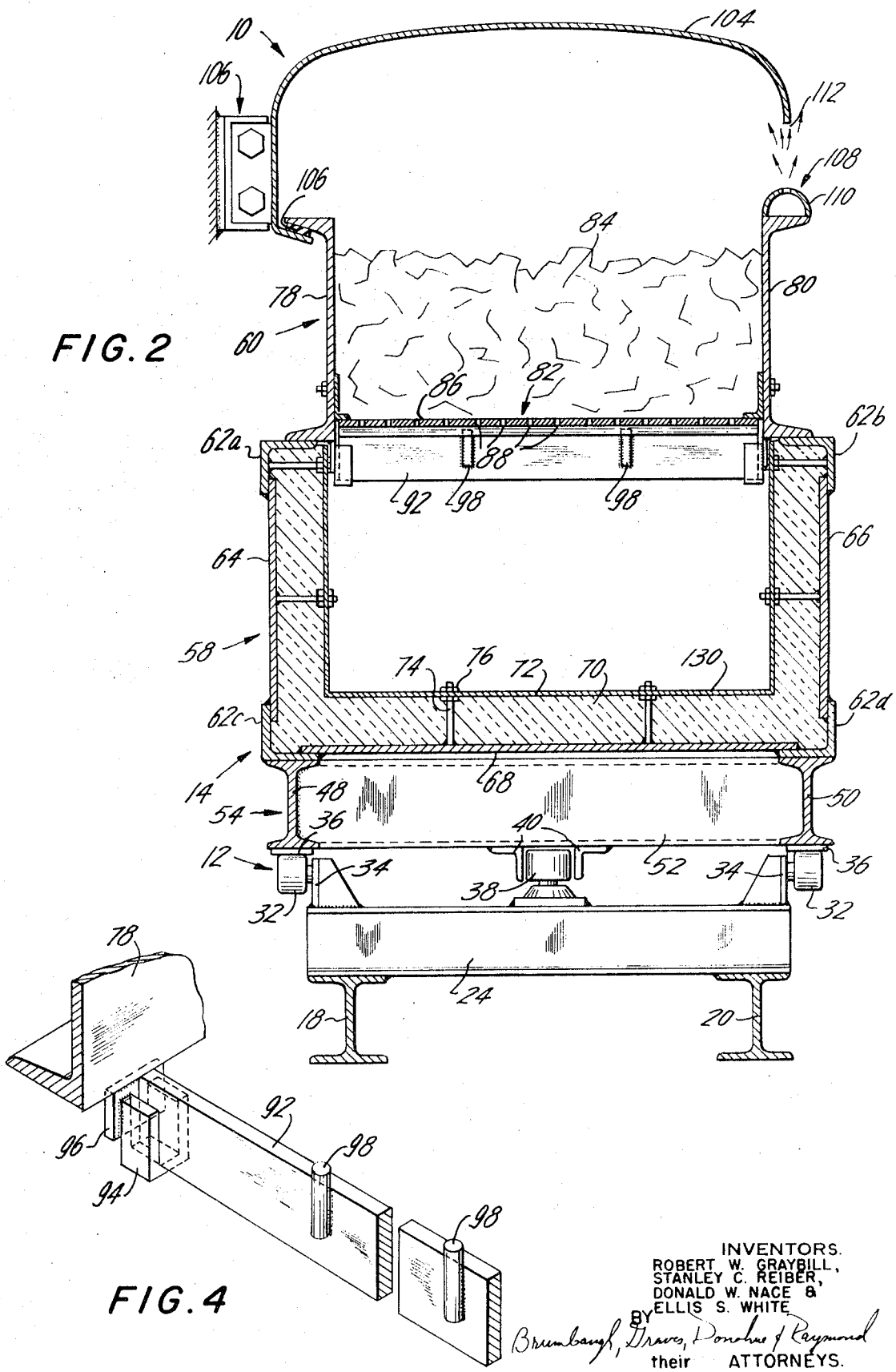

3,667,747
CONVEYOR HEATER
Robert W. Graybill, Stanley C. Reiber, and Donald W. Nace, York, Pa., and Ellis S. White, Glyndon, Md., assignors to Fecor Industries, Ltd., York, Pa.
Filed May 19, 1970, Ser. No. 38,849
Int. Cl. F27b 1/20
U.S. Cl. 266—24                                    10 Claims

ABSTRACT OF THE DISCLOSURE

An apparatus for preheating a scrap charge before it is melted in a furnace includes a combustor and a plenum which are installed on a vibratory conveyor for movement conjointly therewith. The combustor, which has a non-refractory combustion chamber lining which is cooled by the incoming air, delivers heated air under pressure to the plenum located under the conveyor trough, from which the heated air is forced through a plurality of passageways in the conveyor surface to the scrap charge carried in the conveyor trough. After the scrap is preheated, a gate-ramp at the downstream end of the conveyor lowers to deliver the scrap to the furnace.

BACKGROUND OF THE INVENTION

In a metallurgical melting process, and in particular, one using an electric furnace as the primary melting device, the scrap charge is often preheated for several reasons: to remove oils and moisture from the charge, to increase the furnace utilization resulting from the residual heat contained in the scrap charge, and to reduce the total melting costs by supplying a portion of the melting energy from lower cost fossil fuels.

Preheating of the scrap charge by means heretofore known has been limited as to efficiency and dependability. One widely used system delivers a scrap charge to the furnace in batches, each batch being preheated in a bucket. One of the principal limitations of the bucket system is the excessive length of the hot gas flow path through the scrap charge. This requires wide temperature variations within the scrap charge to impart a given quantity of heat to the center of the charge, and accordingly, some portions of the charge are heated to temperatures well beyond those considered desirable. The high temperatures lead not only to rapid oxidation of the scrap but also to other metallurgical problems, such as casting chill, which appears in certain castings made of scrap exposed to excessive gas temperatures during the preheating cycle. The high preheat temperatures of the bucket-type preheating system cause still other problems. The buckets must be protected from higher temperatures, thus increasing the installation and maintenance costs of the system. The hottest scrap has a tendency to hang up in the charge bucket, and high density, low-cost scrap cannot be used as a substantial percentage of the total charge. Furthermore, heating the interior of the batch charge through the deep bed requires that the heating time, and thus the preheat cycle, be relatively long. With regard to more general limitations, several independent and intermittent operations, including the loading and discharging of the several buckets, must be established and controlled for the bucket-type system. This means that the costs are high, both for the initial installation and for the later operating and maintenance. Also, this further increases the length of the preheat cycle, since non-productive intervals are present in the preheating operation.

Several attempts have been made to heat the scrap charge while it is carried on a vibratory conveyor. Vibratory conveyors have several inherent advantages over the bucket-type conveyors, such as enabling the furnace to be continuously charged from a low elevation, or to be rapidly charged to keep the furnace door closed for a longer portion of the time. Moreover, equipment cool-down between the preheating cycles is minimized. However, the vibratory conveyors heretofore used have had several limitations. Some have required placing a hood over the conveyor. Means to heat the scrap have alternatively included passing hot gases over the top surface of the scrap bed or installing burners in the hood to heat the scrap passing under the burners by direct flame impingement. These attempts have been unsuccessful for various reasons, two of these being rapid oxidation of the scrap charge due to the high surface temperatures of the charge and buckling of the conveyor mechanism and troughs due to thermal expansion. Other apparatus for heating material carried on a vibratory conveyor have utilized duct means for directing hot gas under pressure through the material on the conveyor. A particular disadvantage with these, though, is the need for a flexible connection between the fixedly located combustor and the duct, which connection is subject to rapid failure at the temperatures required to heat the scrap material for an electric furnace. For example, flexible materials have been found to fail above 600° F., while temperatures in excess of 1400° F. are often used for preheating the scrap.

SUMMARY OF THE INVENTION

There is provided, in accordance with the invention, an apparatus for preheating the scrap charge before delivery to a furnace for use in combination with a vibratory conveyor. The conveyor trough upon which the scrap material is loaded is perforated, the passageways being small enough that the scrap cannot pass therethrough. The preheater apparatus forces hot gas through these passageways and then through the interstices in the scrap charge to uniformly heat the scrap charge by convection and conduction. In this way, temperature variations throughout the scrap charge are minimized, and the problems associated with overheating a portion of the charge are eliminated. A combustor, which provides the hot gas, and a plenum, which receives the hot gas and directs it through the passageways, are both carried by the conveyor for movement conjointly therewith. With no relative movement between the combustor, the plenum, and the conveyor, flexible connections for the hot gas duct, with the resultant rapid wear and expense, are eliminated. A combustor suitable for withstanding the vibratory motion is provided in a preferred embodiment of the invention, in which the combustion chamber liner is metallic, rather than refractory, and is cooled by the incoming air being passed over the liner. Heat transfer may be increased by adding fins to the outside surface of the combustion chamber liner if desired. The plenum is located under the conveyor surface to distribute the heated gas uniformly through the passageways in the conveyor surface and upward through the scrap material.

In another preferred embodiment of the invention, the lower interior surface of the plenum is substantially flat and comprises a second conveying surface for conveying debris, such as dirt or other fine materials, which fall through the openings in the conveying surface into the plenum to the downstream (with respect to the direction of conveying) end of the plenum, where the debris is removed through a suitably provided opening which can be activated automatically if desired. In still another preferred embodiment of the invention, the vibratory conveyor moves back and forth in a straight-line direction along rollers, and the combustor, which is of the fuel-injection type, is carried by the conveyor in a position for movement back and forth in a direction which is parallel to the axis of the flame body. Also provided is a conveying surface comprised of a plurality of perforated plates, which are installed over pins fixed to the bed plate supports through holes adjacent the upstream edge of the plates. With the upstream end of each conveyor plate thus fixed by the pins, the downstream end is overlapped over the upstream end of the next downstream plate, thereby providing room for expansion of the plates without buckling and permitting relatively easy removal and installation of the plates.

BRIEF DESCRIPTION OF THE DRAWINGS

In the accompanying drawings:

FIG. 1 is a side elevational view in partial section of a vibratory conveyor for preheating a scrap charge according to the invention;

FIG. 2 is an elevational view in section of the conveyor scrap heater taken on line 2—2 of FIG. 1 looking in the direction of the arrows;

FIG. 3 is an enlarged elevational view of the conveying surface cut-away to show the overlapping arrangement of the conveyor plates;

FIG. 4 is an enlarged detailed view in perspective of the support structure for the plates;

FIG. 5 is a longitudinal, sectional view of the combustor taken on the line 5—5 of FIG. 1 looking in the direction of the arrows.

DESCRIPTION OF EXEMPLARY EMBODIMENT

Referring to a typical embodiment of the invention in FIGS. 1 and 2, the conveyor scrap heater, generally indicated by reference numeral 10, includes a support structure or frame 12, a structure 14, which is reciprocally movable, and drive means 16 for moving the structure 14 reciprocally with respect to the support frame 12, which, through appropriate friction-reducing rollers, both supports and guides the movement of the structure 14. The structural members for the frame 12 include two longitudinally extending I beams 18 and 20, which are anchored to the floor of the building by suitable means, and three shorter I beams 22, 24 and 26 and two channel sections 28 and 30 which transversely extend between the I beams 18 and 20 and to which they are attached by suitable means such as welding. It is clear to a person skilled in the art that the movable structure of a conveyor depending upon reciprocatory or vibratory motion for the conveying action can follow many variations and combinations of rectilinear and curvilinear paths, and depending upon the timing of the reciprocatory motion, material will be satisfactorily conveyed. According to the preferred embodiment of the invention, the movable structure 14 is reciprocated back and forth in a straight-line direction; however, it is understood that many variations of the path of reciprocating can be employed with equal efficacy. For example, the movable structure 14 can be pivotably mounted for movement as in a four-bar link mechanism.

A plurality of support rollers 32 are journalled into plates 34 which are gusseted and welded to the I beams 22, 24, and 26. The movable structure 14 contacts the rollers 32 at hardened wear plates 36, which are at least slightly longer than the travel of the movable structure 14. A pair of guide rollers 38, journalled into suitable brackets welded to the I beam 24 and the channels 28 and 30, respectively, each cooperates with a pair of guide angles 40, which similarly to the wear plates 36 are slightly longer than the movement of the structure 14, to restrict the transverse movements of the movable structure 14.

The reciprocating drive means 16, which may be any one of several types known to persons skilled in the art, is fastened by suitable means to the support structure 12. Operating through a connecting rod 42, which is pivotably connected to the movable structure by, for example, a coventional clevis 44 and pin 46 arrangement, the drive means 16 reciprocally moves the movable structure 14 with respect to the fixed structure 12 in a straight-line direction as determine by the support means including the rollers described above.

The frame 54 for the movable structure includes two longitudinally extending I beam rails 48 and 50, which are maintained in a spaced relationship by transversely extending channels 52. The channels 52 are fastened by suitable means, such as welding, to the I beams 48 and 50. It is the frame 54 which is directly supported by the roller assemblies and moved by the reciprocating drive means 16. Fixedly mounted to the frame 54 are the combustor 56, the plenum 58 and the conveyor trough 60.

The conveyor trough 60 which is approximately the same length as the plenum 58, is fixedly installed above the plenum 58 and encloses the upper portion of the plenum 58. As shown in FIG. 2, the plenum 58 is of channel-shaped cross-section, having four corners formed by longitudinally-extending structural steel angle members 62a, 62b, 62c and 62d which are enclosed by a pair of side plates 64 and 66 and a bottom plate 68. The junction, which may be welded, between the plates 64, 66 and 68 and the angle members 62a, 62b, 62c and 62d need not be completely air tight, although greater resistance to the passage of air helps to maintain a slight operating pressure in the plenum 58. The downstream end of the plenum 58 is suitably enclosed by a plate (not shown) and the conveyor trough 60 extends between the upper angle members 62a and 62b to complete the plenum enclosure. The walls of the plenum 58, including the side members 64 and 66 and the angle members 62a, 62b, 62c, and 62d, are sufficiently strong to support the conveyor trough 60 relative to the frame 54. Although one specific type of conveyor support structure is described, other structural configurations may be used to support major conveyor components such as the plenum, perforated bed plates, etc. or to meet job conditions.

The structural members of the plenum 58 are lined on the bottom and sides by high temperature block insulation 70, which is covered on the inside surface with a light gauge stainless steel or other high temperature alloy liner 72. The block insulation 70 and the liner 72 are retained against the plenum structural members by the bolts 74 and nuts 76.

The conveyor trough 60 includes two longitudinally extending side members, 78 and 80, which may be structural steel channel sections, and a conveying surface 82 extending between and supported by the side members 78 and 80 to form a channel-shaped trough for conveying the scrap material 84. As shown in FIGS. 3 and 4, the conveying surface 82 includes a plurality of plates 86, each plate having a plurality of passageways or openings 88 therethrough which are small enough to prevent the scrap material 84 from passing through. The plates 86 are supported at their upstream end 90 by transversely extending bars 92. The bars 92 in turn rest within a pair of U-shaped blocks 94 having upwardly extending openings, each block 94 supporting a respective end of the bar 92, and being welded along with a plate 96, to a respective side member 78 or 80. The transversely-extending bars 92 each carry two pins 98, it being understood that the number of pins may vary between one and several or more, which extend through a corresponding pair of holes 100 located near the upstream end 90 of each of the plates 86. The upstream end 90 of each plate 86 is thus located by the pins 98, thereby preventing longitudinal movements of the plates 86 while permitting easy removal of the plates 86 in the vertical direction. The downstream end 102 of each plate is supported in the vertical direction, but is not held in place in the longitudinal direction. For all but the last plate 103 in the downstream direction, the vertical support is obtained by overlapping the upstream plate 86 with the next plate 86 in the downstream direction, thereby allowing both the conveyed material to pass over the joint and the conveyor plates 86 to thermally expand.

Since noxious fumes may be developed during the heating of the scrap 84, a hood 104 is positioned over the conveyor trough 60. However, to eliminate any need for a flexible connection, the hood 104 is fixed relative to the building through suitable mounting means 106, so that while the conveyor trough is reciprocating, the hood 104 remains stationary. Suitable exhaust means (not shown) are provided to remove the fumes from beneath the hood 104. An air seal is shown by way of illustration, although the need for a seal may be overcome by providing exhaust means of sufficient capacity, and includes gasket means 106 and means for producing an air curtain 108 comprising a duct 110 arranged on the upper flange of the side member 80 to direct a stream of air at the open edge 112 of the hood 104. The air curtain permits visual observation of the progress of the preheating cycle.

The combustor 56 is also carried by the frame 54 and is positioned in line with, and upstream of, the plenum 58. Although many variations of the position of the combustor are readily obvious to a person skilled in the art, in a preferred embodiment of the invention, the combustor is mounted for movement parallel with the axis of the flame body, which is substantially concentric with the axis of the burner 128 which mixes the fuel and air and forms a diverging cone-shaped flame. With particular reference to FIG. 5, the combustor 56 includes an enclosure 112 and a combustion chamber liner 116 which is concentrically installed inside the enclosure 112. The combustor 56 is supplied with fuel, which can be either gas or oil, through a hose 114. According to the preferred embodiment of the invention, the combustor is of the fuel-injection type and requires no refractory lining for the combustion chamber. This general type of combustor, well known to persons skilled in the art, includes a metallic combustion chamber liner 116. The outside surface 117 of the liner 116 is cooled by the incoming combustion air which is drawn through an air intake 118 located at the discharge end of the combustor 56. A plurality of projections or fins 119 may be welded, or attached by other conventional means, to the outside surface of the combustion chamber liner 116 to further enhance the transfer of heat to the incoming combustion air. The absence of a refractory lining for the combustion chamber makes this type of combustor particularly adaptable for mounting on the movable structure 14 of the conveyor scrap heater 10.

A short, relatively simple, sheet metal duct 120 connects the outlet of the combustor 56 with the intake of the plenum 58 to complete the system for delivering the hot gas. It is readily apparent that it is a particular advantage of mounting the combustor 56 on the movable structure 14 that no flexible connection, with its concomitant rapid wear and failure rate, is required in the hot gas delivery system. It is a further advantage of forcing heated gas through the scrap material 14 that the scrap material 84 is uniformly heated by convection. Thus the large temperature differentials experienced when the scrap is heated by conduction from a hot surface are avoided.

In operation the scrap material 84 is loaded into the conveyor trough 60 in the direction of the arrow 122 onto a heavy receiving or impact plate 124. The gate-ramp 126, which is pivotally mounted to the frame 54, is maintained in the raised position at this time by hydraulic cylinders 127 to prevent discharge of the scrap material 84 from the conveyor trough 60. Throughout the loading operation, and the subsequent heating and delivery operations, the reciprocating drive means 86 may be vibrating the conveyor trough 60 to convey the scrap material 84 to the downstream end of the conveyor trough. Under batch type charging operations, the conveyor 10 will be stopped during the heating cycle and will be re-started at the end of the heating cycle to charge the furnace. Under a continuous charging process, the conveyor 10 is not shut off and heating takes place as the charge 84 moves along the conveyor trough. The rates of charging and discharging of scrap are adjusted to maintain steady state heating. In either process, the hot gases are forced from the combustor 56 into the plenum 58 and upwardly through the passageways 88 and through the scrap material 84. The hot gases, along with the fumes driven from the scrap material 84, are then drawn through the hood to the exhaust means.

Since the plenum 58 is carried conjointly with the conveyor trough 60, the same reciprocating motion which carries the scrap material 84 along the conveyor trough 60 also conveys any dirt or other fine particles which pass through the openings 88 into the plenum 58 in the same direction and in the same manner as the main conveying motion. Accordingly, the plenum 58 according to the present invention is provided with a relatively flat interior bottom surface 130 so that the debris can be conveyed to the downstream end of the conveyor scrap heater 10. A door 132, or other suitable access means, is provided at the downstream end of the plenum 58 for removal of the debris which accumulates there.

To illustrate the heating process provided by the combined operation of the apparatus described above, recourse is made to an actual apparatus constructed in accordance with the present invention in which the following nominal results were obtained for the scrap material listed:

HEAVY STAMPINGS

Material weight—170 lbs./cu. ft.
Heating time—12 minutes
Final nominal scrap temperature—1175° F.

STRUCTURAL STEEL

Material weight—90 lbs./cu. ft.
Heating time—12 minutes
Final nominal scrap temperature—900° F.

LIGHT STAMPINGS

Material weight—40 lbs./cu. ft.
Heating time—12 minutes
Final nominal scrap temperature—1150° F.

The above-described embodiment of the invention is intended to be merely exemplary, and those skilled in the art may make numerous modifications and variations without departing from the spirit and scope of the invention. For example, the reciprocating drive means need not be mounted underneath the conveyor structure, but may be mounted behind or in front of the conveyor. In still other modifications the conveying surface may be inclined with respect to the horizontal, the scrap material may be continuously conveyed (without stopping it by means of a gate-ramp) and the reciprocating structure may be either pivotally or slidingly connected by any of several alternative means. Although the heating of scrap has been described specifically, it will be apparent that the materials may be handled by this apparatus in processes such as the heating of stone, the drying of aggregates and the thermal reclamation of sand. All such modifications and variations are intended to be included within the scope of the invention, as defined in the appended claims.

We claim:
1. An apparatus, comprising:
   a conveyor having a conveying surface formed with a plurality of passageways, said passageways being sufficiently small that passage of solid materials therethrough is prevented;
   reciprocating drive means for vibrating the conveyor;
   combustor means for providing heated gas under pressure;
   means for mounting the combustor means to the conveyor for movement conjointly therewith; and duct means communicating with the combustor means and operatively associated with the conveyor for directing the heated gas through the passageways in said conveyor to heat the solid material conveyed thereon.

2. An apparatus according to claim 1 wherein the duct means includes a plenum located under the conveyed surface, the plenum being adapted for movement conjointly with the conveying surface and having an interior communicating with the passageways in the conveying surface.

3. An apparatus according to claim 2 wherein the conveying surface having a plurality of passageways forms at least part of the enclosure for the plenum.

4. An apparatus according to claim 1 wherein the combustor means comprises a combustion chamber lining made of a metallic material and having an outer surface, and means for directing air across the outer surface whereby the combustion chamber lining is cooled.

5. An apparatus according to claim 1 wherein the combustor means includes a burner for mixing fuel and air, and wherein the combustor means is positioned on the conveyor for vibratory movement along an axis substantially parallel to the axis of the burner.

6. An apparatus for conveying and heating solid materials, comprising:
a trough for carrying the solid materials including a first conveying surface having a plurality of passageways, said passageways being sufficiently small to prevent the passage of the solid materials therethrough;
means mounting said trough for reciprocating movement in a longitudinal direction;
drive means operatively connected for moving the trough in a reciprocating manner effective to cause the solid materials to be conveyed along the trough;
combustor means for producing heated gas under pressure; and
a plenum located under the trough and communicating both with the combustor means and with the passageways, said plenum being carried by the trough for movement conjointly therewith and including a second conveying surface for receiving and conveying material which passes through said passageways to a predetermined location for removal.

7. An apparatus according to claim 6 and further comprising the combustor means being carried by the trough for movement conjointly therewith.

8. An apparatus according to claim 6 wherein the combustor means includes a combustion chamber lining made of a metallic material and having an outer surface, a plurality of projections in a heat-conductive relationship to the outer surface of the combustion chamber lining, and means for directing air across the outer surface and the projections, whereby the combustion chamber lining is cooled.

9. An apparatus according to claim 6 wherein said means for mounting the trough for reciprocating movement includes means for mounting said trough for sliding movement in a straight-line direction.

10. An apparatus according to claim 6 wherein the first conveying surface includes a plurality of plates, said plates being distributed in the longitudinal direction of the first conveying surface and being arranged so that adjacent plates are at least partially in an overlapping relationship, and further comprising means acting upon said plates substantially adjacent the upstream edge of each of the plates for securing the plates against motion in the direction of conveying including means for respectively supporting said plates adjacent the upstream edge of the plates, each of said plates having at least one hole adjacent the upstream edge, and at least one projection carried by said supporting means in an operative relationship to the respective plate for cooperating with the hole to secure the respective plate against motion in the direction of conveying.

References Cited

UNITED STATES PATENTS

| | | | |
|---|---|---|---|
| 3,539,163 | 11/1970 | Mitchell | 266—33 R |
| 2,041,844 | 5/1936 | Lindner | 263—21 C |
| 3,434,703 | 3/1969 | Shedd et al. | 263—21 C |
| 1,564,813 | 12/1925 | Babendreier | 263—21 C |
| 1,824,351 | 9/1931 | Hunt | 263—21 C |
| 2,492,585 | 12/1949 | Kohout | 263—21 C |
| 3,358,385 | 12/1967 | Maberry | 266—21 |

GERALD A. DOST, Primary Examiner

U.S. Cl. X.R.

13—33; 214—18 SC; 263—21 C; 266—33 S